(12) United States Patent
Segev et al.

(10) Patent No.: US 9,436,633 B2
(45) Date of Patent: Sep. 6, 2016

(54) MULTI-SLOT MULTI-POINT AUDIO INTERFACE

(71) Applicant: Marvell World Trade Ltd., St. Michael (BB)

(72) Inventors: Eran Segev, Tel Aviv (IL); Pierandrea Savo, Dorno (IT); Asaf Refaeli, Petach Tikva (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 353 days.

(21) Appl. No.: 14/184,803

(22) Filed: Feb. 20, 2014

(65) Prior Publication Data

US 2014/0244884 A1  Aug. 28, 2014

Related U.S. Application Data

(60) Provisional application No. 61/768,048, filed on Feb. 22, 2013.

(51) Int. Cl.
*G06F 13/20* (2006.01)
*G06F 13/36* (2006.01)
*G06F 13/38* (2006.01)

(52) U.S. Cl.
CPC ............ *G06F 13/36* (2013.01); *G06F 13/385* (2013.01)

(58) Field of Classification Search
None
See application file for complete search history.

(56) References Cited

U.S. PATENT DOCUMENTS

| | | |
|---|---|---|
| 2004/0267997 A1 | 12/2004 | Grzybowski et al. |
| 2007/0015524 A1 | 1/2007 | Lee |
| 2007/0124526 A1 | 5/2007 | Sinai |
| 2012/0272089 A1* | 10/2012 | Hatfield ............. G06F 13/4291 713/501 |
| 2012/0311371 A1 | 12/2012 | Shaeffer |

OTHER PUBLICATIONS

"I2S Bus Specification," Philips Semiconductors, pp. 1-7, Feb. 1986.
International Application # PCT/IB2014/059119 Search Report dated Jun. 13, 2014.
MIPI® Alliance Specification for "Serial Low-power Inter-chip Media Bus" (SLIMbus®), version 1.1 , pp. 1-221, Sep. 28, 2012.

* cited by examiner

*Primary Examiner* — Scott Sun

(57) ABSTRACT

An apparatus includes multiple media processing modules and a control unit. The media processing modules are configured to exchange digital media signals over a shared bus. The control unit is configured to determine a desired connectivity scheme among the media processing modules, to adaptively define, based on the desired connectivity scheme, connections that transfer the media signals among the media processing modules over the shared bus, and to instruct the media processing modules to establish the connections, by communicating with the media processing modules over a control interface that is independent of the shared bus.

21 Claims, 4 Drawing Sheets

MULTI-SLOT MULTI-POINT AUDIO INTERFACE

CROSS-REFERENCE TO RELATED APPLICATIONS

This application claims the benefit of U.S. Provisional Patent Application 61/768,048, filed Feb. 22, 2013, whose disclosure is incorporated herein by reference.

FIELD OF THE DISCLOSURE

The present disclosure relates generally to audio processing, and particularly to digital audio interfaces.

BACKGROUND

Cellular phones and other mobile communication terminals typically comprise various modules that process audio signals, such as a modem, a hardware codec, an FM receiver, a Bluetooth transceiver, a speakerphone amplifier or a digital microphone. Various interfaces are known in the art for transferring audio signals between audio modules, such as Pulse-Code Modulation (PCM), Inter-IC Sound ($I^2S$), Serial Low-power Inter-chip Media Bus (SLIMbus) or SoundWire interfaces. The $I^2S$ interface is specified in "$I^2S$ Bus Specification," Philips Semiconductors, February 1986, which is incorporated herein by reference.

The description above is presented as a general overview of related art in this field and should not be construed as an admission that any of the information it contains constitutes prior art against the present patent application.

SUMMARY

An embodiment that is described herein provides an apparatus including multiple media processing modules and a control unit. The media processing modules are configured to exchange digital media signals over a shared bus. The control unit is configured to determine a desired connectivity scheme among the media processing modules, to adaptively define, based on the desired connectivity scheme, connections that transfer the media signals among the media processing modules over the shared bus, and to instruct the media processing modules to establish the connections, by communicating with the media processing modules over a control interface that is independent of the shared bus.

In some embodiments, the control unit includes a connectivity scheme determination module, which is configured to determine the desired connectivity scheme, a connection definition module, which is configured to adaptively define the connections, and a control communication interface, which is configured to communicate with the media processing modules over the control interface.

In an embodiment, the control unit is configured to determine the desired connectivity scheme by identifying, based on a mode of operation of the apparatus, groups of the media processing modules that are to exchange the media signals, and to define the connections between the identified groups of the media processing modules. In various embodiments, the media processing modules include at least one module type selected from a group of types comprising a modem, a Wireless Local Area Network (WLAN) transceiver, an application processor, a codec, an FM receiver, a Bluetooth transceiver, a speakerphone amplifier and a digital microphone.

In another embodiment, the control unit is configured to adaptively modify a clock rate of the shared bus to match a current number of the connections. In a disclosed embodiment, the control unit is configured to divide fixed-size time frames on the shared bus into an adaptively-varying number of time slots depending on a current number of the connections. In an example embodiment, the control unit is configured to adaptively assign the time slots to the respective connections, depending on the desired connectivity scheme. In another embodiment, the control unit is configured to modify the number of time slots per time frame in response to a change in the desired connectivity scheme.

In yet another embodiment, the control unit is configured to assign one or more of the time slots to each of the connections, and to notify the media processing modules of the assigned slots using the control interface, and the media processing modules are configured to establish the connections on the assigned time slots. In still another embodiment, ones of the time slots each have a maximum data capacity, and the media processing modules are configured to transmit in the respective time slots a data size that is lower than or equal to the maximum data capacity.

In some embodiments, a mobile communication terminal includes the disclosed apparatus. In some embodiments, a chipset for processing signals in a mobile communication terminal includes the disclosed apparatus.

There is additionally provided, in accordance with an embodiment that is described herein, a method including, in a mobile communication terminal that includes multiple media processing modules connected by a shared bus, determining a desired connectivity scheme among the media processing modules. Connections that transfer digital media signals among the media processing modules are adaptively defined over the shared bus, based on the desired connectivity scheme. The media processing modules are instructed to establish the connections, by communicating with the media processing modules over a control interface that is independent of the shared bus.

The present disclosure will be more fully understood from the following detailed description of the embodiments thereof, taken together with the drawings in which:

DETAILED DESCRIPTION OF EMBODIMENTS

Figure 1:
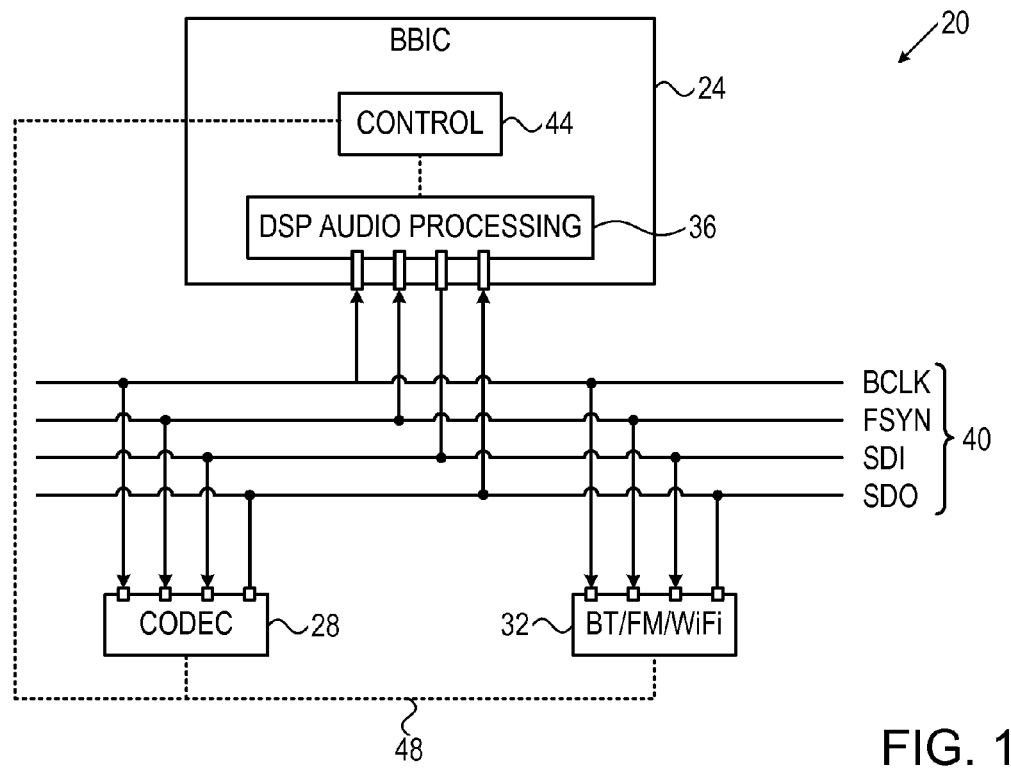
FIG. 1 is a block diagram that schematically illustrates elements of a mobile communication terminal, in accordance with an embodiment that is described herein.

Embodiments that are described herein provide improved methods and systems for interconnecting media processing modules, such as audio modules, in mobile communication terminals and other electronic equipment. In some embodiments, a mobile communication terminal comprises multiple audio modules, such as audio processing circuitry in the modem, a hardware codec, an FM radio receiver and/or a Bluetooth transceiver, to name just a few examples. The audio modules are interconnected by a shared audio bus that is controlled by a control unit in the baseband Integrated Circuit (BBIC) of the terminal. The embodiments described herein refer mainly to audio modules and audio streams. The disclosed techniques, however, are similarly applicable to other types of media processing modules and media streams, for example video.

In the disclosed embodiments, the control unit tracks the terminal's current or expected mode of operation, and determines an audio connectivity scheme that is suitable for this mode. In other words, the control unit adaptively defines logical connections between audio modules for transferring audio streams. The control unit allocates resources (e.g., time slots) of the shared audio bus to the logical connections, and configures the various audio modules to communicate using the allocated bus resources, in an embodiment.

The description that follows refers mainly to logical connections between pairs of audio modules, i.e., to point-to-point connections. Generally, however, a given connection defined in the audio connectivity scheme may involve a group of more than two audio units, e.g., an audio unit that sends an audio stream to multiple other audio units.

In some embodiments, communication over the shared audio bus is dedicated to transferring audio streams. Control-related communication between the control unit and the audio modules is carried out over a separate control interface that is independent of the shared audio bus. This separation simplifies the circuitry that accesses the shared bus in the audio modules. Moreover, in some embodiments the control interface is implemented using an existing interface of the terminal, without additional hardware.

Typically, the shared audio bus operates in accordance with a Time-Division Multiplexing (TDM) protocol that defines time frames divided into time slots, in an embodiment. The control unit allocates one or more of the slots of each frame to each logical connection. When the terminal's mode of operation changes, the control unit reconfigures the connections between audio modules and reassigns the slots accordingly.

In some embodiments, the frames are fixed in length, but the slot length and the number of slots per frame are configurable. In an example embodiment, the control unit modifies the number of slots per frame by modifying the clock rate of the bus. In this embodiment, the number of bits per slot is fixed, but the control unit is able to fit the necessary number of slots per frame by modifying the bit rate. This feature is highly efficient in terms of power consumption: The bus clock rate is set to the lowest possible rate that still supports the required number of connections between audio modules.

In summary, the disclosed techniques interconnect the audio modules using an adaptively-controlled multipoint-to-multipoint audio bus. Adaptation of the bus configuration, e.g., reconfiguration of connections and change of bit rate, are typically performed on-the-fly (i.e., while other connections are ongoing) without loss of data or excessive delay. Using the disclosed techniques, interconnection between audio modules is simpler, and communication terminals can be implemented with lower cost, lower power consumption and reduced Electromagnetic Interference (EMI).

FIG. 1 is a block diagram that schematically illustrates elements of a mobile communication terminal 20, in accordance with an embodiment that is described herein. In various embodiments, terminal 20 comprises, for example, a cellular phone, a smart-phone, a cellular enabled laptop or tablet computer, a cellular-enabled gaming terminal or automotive system, or any other suitable device having communication capabilities.

Terminal 20 comprises a baseband Integrated Circuit (BBIC) 24, and multiple audio modules that carry out various audio processing tasks. Since the embodiments described herein are mainly concerned with transmission of audio streams in terminal 20, the figure focuses on audio-related elements of the terminal. Other elements, such as radio transmission and reception circuitry, have been omitted from the figure for the sake of clarity. It is noted that the disclosed techniques are not limited to audio streams, and is similarly applicable to multimedia streams as well as to data streams in general.

In the present example, the audio modules comprise a DSP audio processing module 36 in BBIC 24, a hardware encoder-decoder (codec) 28, and a Bluetooth/FM-radio receiver/Wi-Fi module 32. Additionally or alternatively, terminal 20 may comprise any suitable kinds of audio modules, such as a modem, a Wireless Local Area Network (WLAN) transceiver, an application processor, a codec, a speakerphone amplifier, a digital microphone, a High-Definition Multimedia Interface (HDMI) or Mobile High-Definition Link (MHL) transmitter, or any other suitable module that performs processing of audio or other media.

The various audio modules in terminal 20 communicate with one another over a shared audio bus 40. In an embodiment, bus 40 is a multi-slot, multi-point bus used for transferring digital audio streams between audio modules (or more generally—transferring media streams between media processing modules). The structure and functionality of bus 40 are described in detail below.

In the example of FIG. 1, bus 40 comprises four lines—a bit-clock line denoted BCLK, a frame synchronization line denoted FSYN, a unidirectional serial data input line denoted SDI, and a unidirectional serial data output line denoted SDO. In an alternative embodiment, bus 40 comprises only three lines, in which case the unidirectional SDI and SDO lines are replaced by a bidirectional serial data input-output line denoted SDI/SDO or SDIO. A four-line configuration provides higher bandwidth (or lower clock rate for a given bandwidth). A three-line configuration, on the other hand, reduces pin-count and is simpler to implement.

In yet another embodiment, the disclosed techniques can be implemented without the FSYN line, e.g., by transmitting a unique frame synchronization pattern on SDI and/or SDO lines. Any suitable signal waveforms and logic levels can be used, such as NRZ or differential pair signaling. Bus 40 is typically defined as a single-controller multi-master bus, because the configuration and allocation of bus resources are defined by a single controller (control unit 44 described below), but any audio module is able to drive the FSYN and BCLK lines.

In some embodiments, bus 40 operates at a Single Data Rate (SDR, also sometimes referred to as single-edge mode). In this mode, the data is sent (and the bus is sampled) on either the rising edges or the falling edges of the BCLK signal. In other embodiments, the bus 40 operates at a Double Data Rate (DDR, also sometimes referred to as single-edge mode). In this mode, the data is sent (and the bus is sampled) on both the rising edges and the falling edges of BCLK. DDR is sometimes preferred, for example in order to double the data rate for a given clock rate, or to reduce the clock rate and thus reduce power consumption.

In the disclosed embodiments, BBIC 24 comprises a control unit 44 that controls and configures bus 40 and the various audio modules. For the purpose of control and configuration, control unit 44 communicates with the audio modules (in the present example modules 28, 32 and 36) over a control interface 48 that is independent of bus 40. In some embodiments, control interface 48 uses resources of an existing bus or other interface of terminal 20, in which case the implementation of interface 48 does not require additional hardware.

In an example embodiment, control unit 44 comprises a connectivity scheme determination module, which is configured to determine the desired connectivity scheme, a connection definition module, which is configured to adaptively define the connections, and a control communication interface, which is configured to communicate with the media processing modules over the control interface. In alternative embodiments, unit 44 is partitioned or otherwise implemented in any other suitable way.

In some embodiments, the clock rate of bus 40 (i.e., the rate of the BCLK signal) is variable and can be changed by control unit 44 during operation and without disrupting or delaying data transfer. This feature helps to conserve power and to reduce electromagnetic interference (EMI).

The configuration of terminal 20 shown in FIG. 1 is an example configuration, which is depicted solely for the sake of clarity. In alternative embodiments, any other suitable terminal configuration can be used. Some terminal elements that are not mandatory for understanding of the disclosed techniques have been omitted from the figures for the sake of clarity. The different elements of terminal 20 are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some terminal elements, e.g., control unit 44, may be implemented using software executing on programmable hardware, or using a combination of hardware and software elements.

When implementing elements of terminal 20, e.g., control unit 44, in software on a programmable processor, the software may be downloaded to the processor in electronic form, over a network, for example, or it may, alternatively or additionally, be provided and/or stored on non-transitory tangible media, such as magnetic, optical or electronic memory. In some embodiments, some or all elements of terminal 20 may be fabricated in a chip-set.

Figure 2:
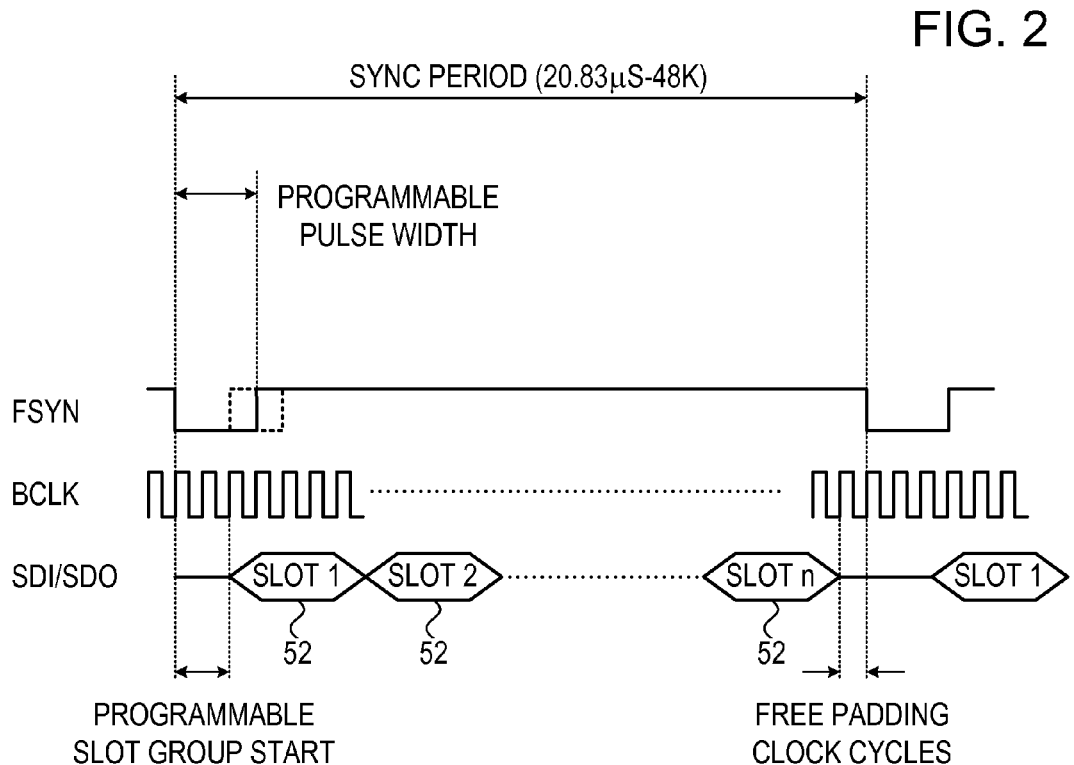
FIG. 2 is a signal diagram showing signal transfer on a shared audio bus, in accordance with an embodiment that is described herein.

FIG. 2 is a signal diagram showing signal transfer on audio bus 40, in accordance with an embodiment that is described herein. In this example, bus 40 comprises only three lines—FSYN, BCLK and SDI/SDO. Communication over bus 40 is performed in a sequence of time frames (referred to as frames for brevity) that are defined by the FSYN signal.

In the present example each frame is 20.83 µS long, i.e., a rate of 48K frames per second. Each frame is divided into n time slots 52 (referred to as slots for brevity). The time slots are used for transferring data over the SDI/SDO line (or in parallel over the SDI and SDO lines in a four-line bus implementation). The numerical values above are depicted solely by way of example. In alternative embodiments, any other suitable frame rate and frame size can be used.

In an embodiment, the frames are fixed in length, but the number of slots per frame and the clock rate of BCLK are programmable by control unit 44. Additionally or alternatively, control unit 44 programs the FSYN pulse width and/or the delay from the beginning of the frame to the beginning of the first slot. In some cases, one or more free clock cycles, which do not belong to any of the time slots, remain at the end of the frame.

The bus protocol shown in FIG. 2 is depicted solely by way of example. In alternative embodiments, any other suitable protocol can be used. In some embodiments, the configuration of bus 40 is backward-compatible with audio modules that support legacy PCM or I$^2$ interfaces. In an example embodiment, a legacy audio module that only supports PCM or I$^2$S is able to communicate over bus 40 using the first time slots of each frame, as long as the legacy audio module sets its data lines to high-impedance (HiZ) when not sending data.

The various audio modules of terminal 20 communicate with one another using one or more point-to-point connections, whose configuration depends on the current mode of operation of the terminal. In other words, at any given time one or more pairs of audio modules send audio streams to one another. For example, during a voice call, audio processing module 36 sends a stream of audio to codec 28 for conversion into an analog signal to be played to the user. In the opposite direction, codec 28 converts an analog signal from a microphone into a digital signal, and sends the resulting digital audio stream to audio processing module 36. Each unidirectional audio stream sent from one audio unit to another audio unit is referred to herein as a connection.

Other examples involve more than two connections and more than two audio modules. For example, when the user of terminal 20 conducts a voice call using a Bluetooth headset, connections are set-up between audio processing module 36 and the Bluetooth transceiver of the terminal. One of these connections carries received audio for playing to the user, and the other connection carries audio from the user intended for transmission. Various other use cases are contemplated.

In yet another example, FM radio receiver (in module 32) sends an audio stream to module 36 for further processing, and module 36 sends this audio stream to codec 28 for conversion to analog and playing to the speaker. In this example the audio connectivity scheme comprises four simultaneous connections (two for stereo FM and two for stereo playback to the codec 28). Two example uses cases are shown in detail in FIGS. 3 and 4 below.

In the context of the present patent application and in the claims, the set of connections that are established between pairs of audio units at a given time is referred to as "audio connectivity scheme." As explained above, the audio connectivity scheme changes from time to time, depending on the mode of operation of the terminal. Control unit 44 is capable of setting up a connection between any two audio modules.

In some embodiments, control unit 44 determines the desired audio connectivity scheme of the terminal, adaptively allocates resources (e.g., time slots) of bus 40 to the connections of the desired audio connectivity scheme, and configures the various audio modules to communicate using the allocated bus resources. Typically, control unit 44 changes the audio connectivity scheme in response to a change in the mode of operation of the terminal. Upon detecting a change of mode, unit 44 reassigns the bus resources to match the updated connectivity scheme.

In some embodiments, control unit 44 assigns each connection a respective time slot index (or possibly multiple slot indices). In an example use case, a certain connection is assigned the first slot of each frame, another connection is assigned the second slot of each frame, and so on. The digital audio streams of the various connections are thus multiplexed on the bus in Time Division Multiplexing (TDM).

During each slot, audio modules that do not transmit on the bus typically set their data pins to high-impedance (HiZ) in order to avoid contention. In an embodiment, the change-over from one transmitting audio module to another (e.g., at slot boundaries) is performed from clock-rise to the subsequent clock-fall of the BCLK line. In another embodiment, the change-over is performed from clock-rise to the subsequent clock-rise of the BCLK line.

In some embodiments, control unit 44 assigns more than one slot per frame to a certain connection, e.g., when this connection requires higher bandwidth than other connections. Generally, the allocated number of slots per frame is not necessarily the same for all connections. For example, a BT module (in module 32) sends only mono data (and therefore uses one slot per direction) while an FM receiver module sends stereo data (and therefore uses two slots per direction). Thus, in an embodiment, control unit 44 assigns the more slots per frame to the former connection than to the latter connection.

In some embodiments, the number of slots per frame is configurable, and control unit 44 sets this number according to the number of connections defined by the audio connectivity scheme. In these embodiments, the number of bits per slot is fixed, but the bit rate of the bus (i.e., the rate of the BCLK signal) is programmable. Control unit 44 changes the number of slots per frame by changing the bit rate.

The bit-rate adaptation mechanism helps reduce power consumption, since at any given time the bus clock rate is kept as low as possible. Typically, control unit 44 operates bus 40 at a high clock rate only when necessary to support a large number of connections simultaneously (and thus necessary to allocate a large number of slots per frame). In an embodiment, the control unit performs bit-rate changes in synchronization with the start time of the frame. Generally, however, this synchronization is not mandatory, and the bit-rate can be changed at any suitable time.

The above embodiment makes it very simple for a given audio module to identify the timing of its allocated slots on bus 40. In an embodiment, to find the beginning of a given slot index, the audio module counts the number of bits from the frame sync pulse of the FSYN line. Since the number of bits per slot is fixed (regardless of the bit rate and of the number of slots per frame), this count enables the audio module to find its allocated slots quickly and with simple hardware or software.

Control unit 44 may change the number of slots per frame in any suitable way. In one embodiment, to add a slot, the bit rate of shared bus 40 is first increased. Then, the audio module that is assigned to receive on the new slot is instructed (using control interface 48) to start receiving on this slot. Finally, the audio module that is assigned to transmit on the new slot is instructed (using control interface 48) to start transmitting on this slot. Typically, although not necessarily, these changes are synchronized with the frame start.

In some embodiments, control unit 44 assigns the first time slots in the frame to the more common use cases, and the last slots in the frame to use cases that occur rarely. Generally, however, any suitable slot assignment can be used.

In alternative embodiments, control unit 44 may adaptively assign the resources of bus 40 in any other suitable way, in order to set-up the connections defined by the desired audio connectivity scheme.

In some embodiments, each slot has a certain maximum data capacity. The audio modules send in each slot a data size that does not exceed the maximum data capacity, but is sometimes lower than the maximum data capacity. In other words, the actual amount of data in a given slot may vary depending on the needs of the audio modules, as long as the maximum data capacity is not exceeded.

Figure 3:
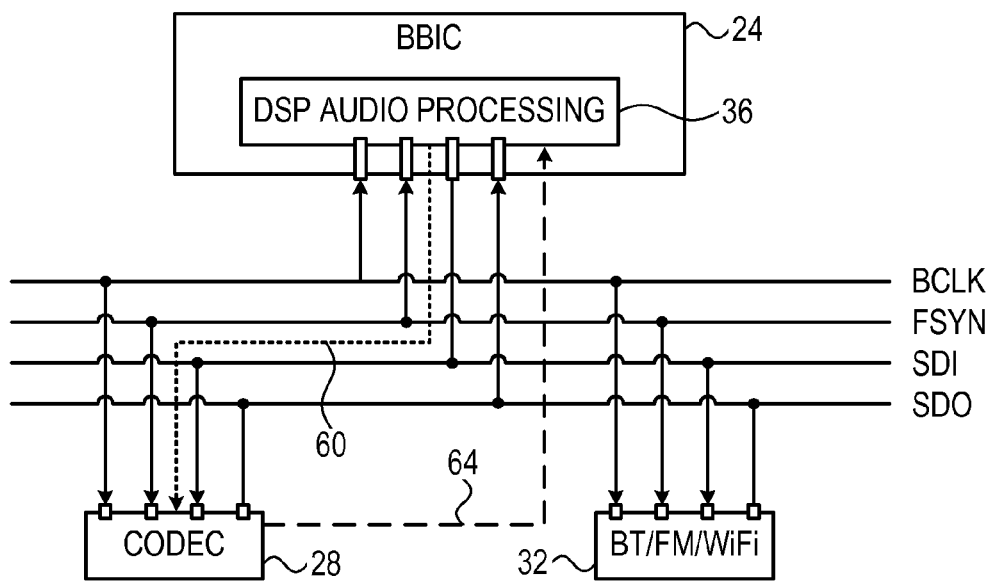
FIGS. 3 and 4 are diagrams that schematically illustrate example use cases of a shared audio bus, in accordance with an embodiment that are described herein.
Figure 3:
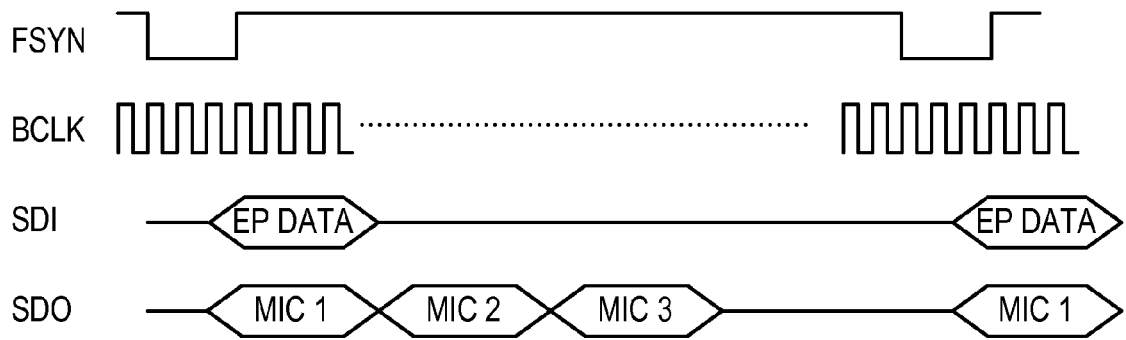

FIG. 3 is a diagram that schematically illustrates an example use case of shared audio bus 40, in accordance with an embodiment that is described herein. In the present example, terminal 20 is engaged in a voice call. In this mode of operation, control unit 44 establishes a first connection 60 from DSP audio processing module 36 to codec 28, and a second connection 64 back from codec 28 to DSP audio processing module 36.

The bottom of the figure shows the slot allocation over the bus for the two connections. In this example, audio of the user is acquired by three microphones connected to codec 28. The three resulting audio streams are sent over three respective slots per frame (denoted MIC1, MIC2 and MIC3) to audio processing module 36 and then on for transmission on the radio channel. At the same time, audio received over the radio channel is processed by module 36 and then sent over a single slot per frame (denoted EP DATA) to codec 28, and then on to the earpiece for playing to the user.

Figure 4:
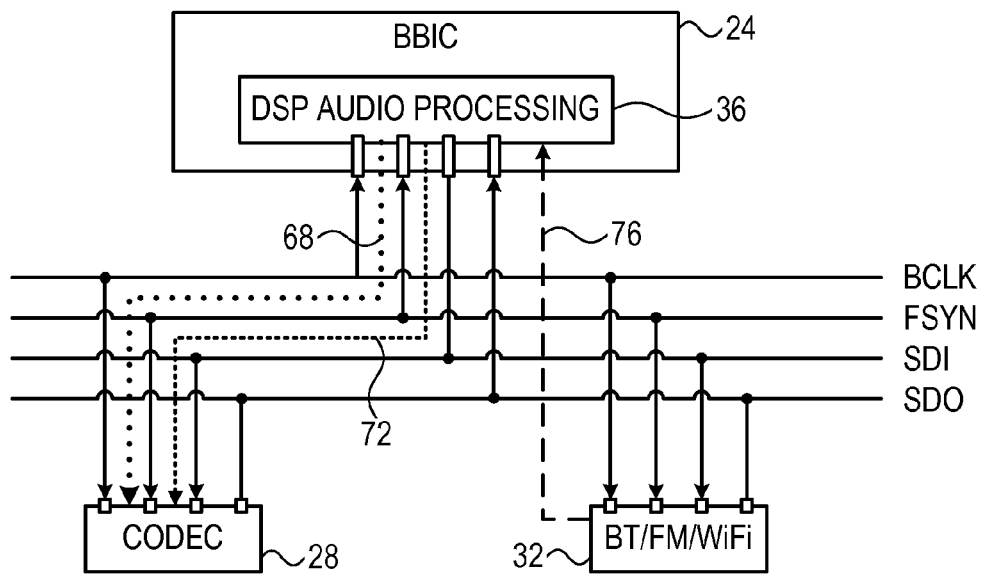
Figure 4:
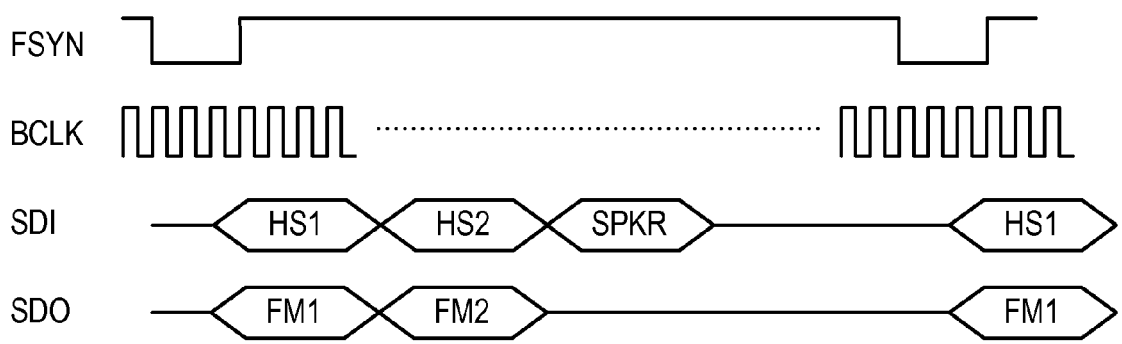

FIG. 4 is a diagram that schematically illustrates another example use case of shared audio bus 40, in accordance with an embodiment that is described herein. In this example, terminal 20 plays a ring-tone to the user via the speaker, and at the same time plays stereo playback via the speaker from the FM radio receiver.

In this mode of operation, control unit 44 establishes two connections 68 and 72 from DSP audio processing module 36 to codec 28, and a third connection from the FM receiver in module 32 to DSP audio processing module 36. The bottom of the figure shows the slot allocation over the bus for the two connections.

In this example, the user is listening to the FM radio using a stereo headset. In this scenario, connections 76 and 68 exist: Connection 76 is used for routing stereo FM audio channels (denoted FM1 and FM2) to audio processing unit 36 for further processing (e.g., volume setting and/or equalization). The resulting audio streams are then routed to codec 28 over connection 68 (slots denoted HS1 and HS2), for delivery to the headset. In parallel, another independent audio stream 72 (such as a ring tone) may be played from module 36 to codec 28 and then to the speaker. The latter stream is denoted SPKR. This scenario may occur, for example, when a phone call is received during FM stereo playback.

The use cases shown in FIGS. 3 and 4 are depicted solely by way of example, in order to demonstrate the configuration and operation of the shared audio bus. In alternative embodiments, the disclosed techniques can be used in any other suitable use case.

Figure 5:
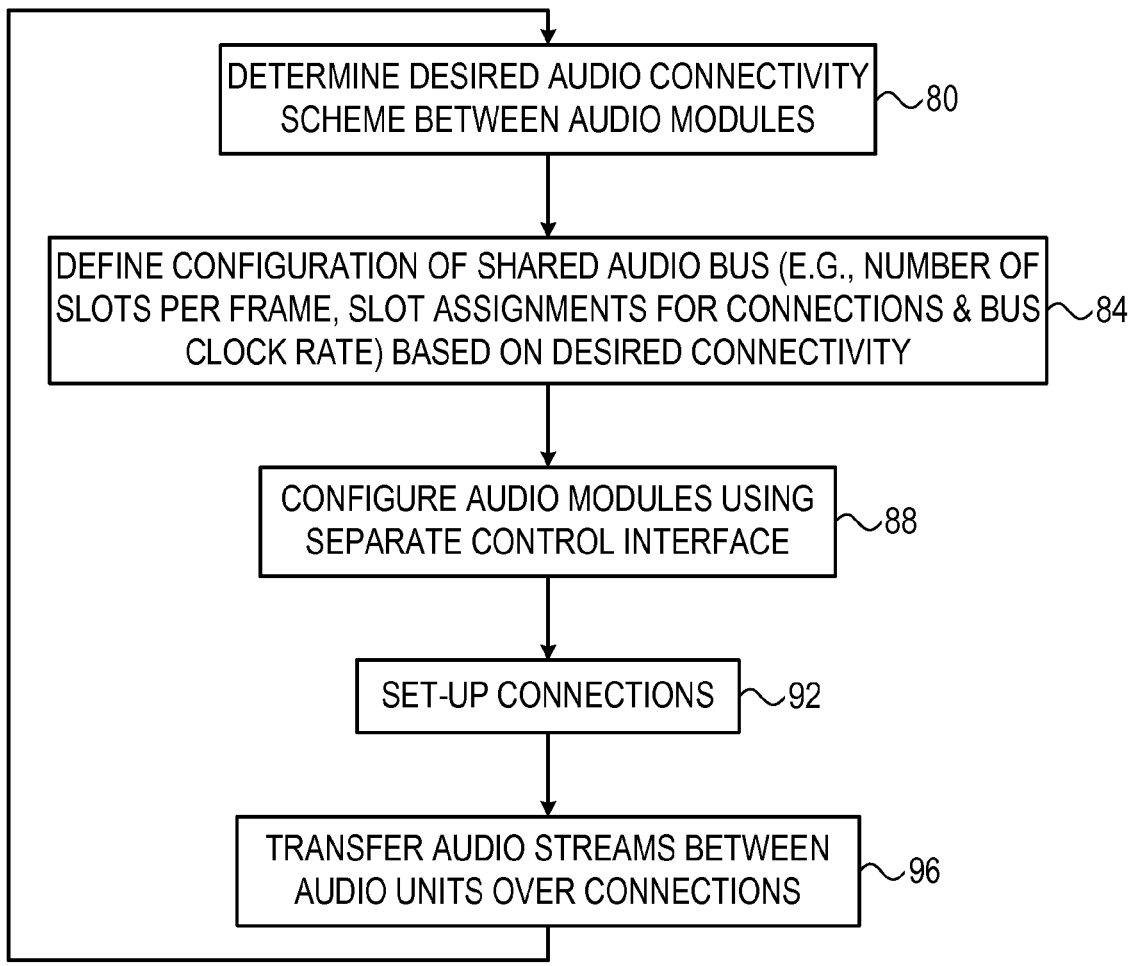
FIG. 5 is a flow chart that schematically illustrates a method for communication over a shared audio bus, in accordance with an embodiment that is described herein.

FIG. 5 is a flow chart that schematically illustrates a method for communication over shared audio bus 40, in accordance with an embodiment that is described herein. The method begins with control unit 44 in BBIC 24 determining the desired audio connectivity scheme for terminal 20, at a connectivity identification operation 80. Typically, control unit 44 derives the connectivity scheme (i.e., the pairs of audio modules that should be connected for transferring audio streams) from the current or expected mode of operation of the terminal.

Control unit 44 defines the configuration of shared audio bus 40 based on the desired audio connectivity scheme, at a bus configuration operation 84. Typically, control unit 44 allocates time slots in the time frames of bus 40 to the various connections defined by the desired audio connectivity scheme.

At a module configuration operation 88, control unit 44 configures each audio module to use its respective allocated bus resources, by communicating with the audio modules over control interface 48. Typically, control unit 44 notifies each pair of audio modules of the slot or slots that are allocated to the connection between them. The various audio modules set up the defined connections, at a connection setup operation 92. The audio modules transfer the audio streams over the established connections, at an audio transmission operation 96.

The method then loops back to operation 80 above, in which control unit 44 potentially re-adapts the desired audio connectivity scheme in response to a change in the terminal mode of operation.

Although the embodiments described herein mainly address audio connectivity in mobile communication terminals, the methods and systems described herein can also be used in other applications, such as in other types of electronic equipment that performs audio processing using multiple audio modules. Moreover, although the embodiments described herein refer mainly to media processing modules that exchange media streams such as audio or video, the disclosed techniques can be used for transferring data streams in general among multiple processing units.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
   multiple media processing modules, which are configured to exchange digital media signals over a shared bus; and
   a control unit, which is configured to determine a desired connectivity scheme among the media processing modules, to adaptively define, based on the desired connectivity scheme, connections that transfer the media signals among the media processing modules over the shared bus, and to instruct the media processing modules to establish the connections, by communicating with the media processing modules over a control interface that is independent of the shared bus.

2. The apparatus according to claim 1, wherein the control unit comprises:
   a connectivity scheme determination module, which is configured to determine the desired connectivity scheme;
   a connection definition module, which is configured to adaptively define the connections; and
   a control communication interface, which is configured to communicate with the media processing modules over the control interface.

3. The apparatus according to claim 1, wherein the control unit is configured to determine the desired connectivity scheme by identifying, based on a mode of operation of the apparatus, groups of the media processing modules that are to exchange the media signals, and to define the connections between the identified groups of the media processing modules.

4. The apparatus according to claim 1, wherein the media processing modules comprise at least one module type selected from a group of types comprising a modem, a Wireless Local Area Network (WLAN) transceiver, an application processor, a codec, an FM receiver, a Bluetooth transceiver, a speakerphone amplifier and a digital microphone.

5. The apparatus according to claim 1, wherein the control unit is configured to adaptively modify a clock rate of the shared bus to match a current number of the connections.

6. The apparatus according to claim 1, wherein the control unit is configured to divide fixed-size time frames on the shared bus into an adaptively-varying number of time slots depending on a current number of the connections.

7. The apparatus according to claim 6, wherein the control unit is configured to adaptively assign the time slots to the respective connections, depending on the desired connectivity scheme.

8. The apparatus according to claim 6, wherein the control unit is configured to modify the number of time slots per time frame in response to a change in the desired connectivity scheme.

9. The apparatus according to claim 6, wherein the control unit is configured to assign one or more of the time slots to each of the connections, and to notify the media processing modules of the assigned slots using the control interface, and wherein the media processing modules are configured to establish the connections on the assigned time slots.

10. The apparatus according to claim 6, wherein ones of the time slots each have a maximum data capacity, and wherein the media processing modules are configured to transmit in the respective time slots a data size that is lower than or equal to the maximum data capacity.

11. A mobile communication terminal comprising the apparatus of claim 1.

12. A chipset for processing signals in a mobile communication terminal, comprising the apparatus of claim 1.

13. A method, comprising:
   in a mobile communication terminal that includes multiple media processing modules connected by a shared bus, determining a desired connectivity scheme among the media processing modules;
   adaptively defining, based on the desired connectivity scheme, connections that transfer digital media signals among the media processing modules over the shared bus; and
   instructing the media processing modules to establish the connections, by communicating with the media processing modules over a control interface that is independent of the shared bus.

14. The method according to claim 13, wherein determining the desired connectivity scheme comprises identifying, based on a mode of operation of the terminal, groups of the media processing modules that are to exchange the media signals, and to define the connections between the identified groups of the media processing modules.

15. The method according to claim 13, wherein the media processing modules comprise at least one module type selected from a group of types comprising a modem, a Wireless Local Area Network (WLAN) transceiver, an application processor, a codec, an FM receiver, a Bluetooth transceiver, a speakerphone amplifier and a digital microphone.

16. The method according to claim 13, wherein adaptively defining the connections comprises adaptively modifying a clock rate of the shared bus to match a current number of the connections.

17. The method according to claim 13, wherein adaptively defining the connections comprises dividing fixed-size time frames on the shared bus into an adaptively-varying number of time slots depending on a current number of the connections.

18. The method according to claim 17, wherein adaptively defining the connections comprises adaptively assigning the time slots to the respective connections, depending on the desired connectivity scheme.

19. The method according to claim 17, wherein adaptively defining the connections comprises modifying the number of time slots per time frame in response to a change in the desired connectivity scheme.

20. The method according to claim 17, wherein adaptively defining the connections comprises assigning one or more of the time slots to each of the connections and notifying the media processing modules of the assigned slots using the control interface, and comprising establishing the connections on the assigned time slots.

21. The method according to claim 17, wherein ones of the time slots each have a maximum data capacity, and comprising transmitting in the respective time slots a data size that is lower than or equal to the maximum data capacity.

* * * * *